(12) United States Patent
Lai

(10) Patent No.: US 6,821,136 B2
(45) Date of Patent: Nov. 23, 2004

(54) ELECTRONIC CARD-EJECTABLE CARD CONNECTOR

(75) Inventor: Yaw-Huey Lai, Taipei Hsien (TW)

(73) Assignee: Tai-Sol Electronics Co., Ltd., Taipei Hsien (TW)

( * ) Notice: Subject to any disclaimer, the term of this patent is extended or adjusted under 35 U.S.C. 154(b) by 0 days.

(21) Appl. No.: 10/420,817

(22) Filed: Apr. 23, 2003

(65) Prior Publication Data

US 2004/0166713 A1 Aug. 26, 2004

(30) Foreign Application Priority Data

Feb. 24, 2003 (TW) ....................................... 92202829 U

(51) Int. Cl.⁷ .............................................. H01R 13/62
(52) U.S. Cl. ...................................... 439/159; 439/160
(58) Field of Search ................................ 439/159, 160, 439/151, 152, 157

(56) References Cited

U.S. PATENT DOCUMENTS

| | | | | |
|---|---|---|---|---|
| 6,036,514 A | * | 3/2000 | Nishioka | 439/159 |
| 6,095,835 A | * | 8/2000 | Oguchi | 439/159 |
| 6,332,790 B1 | * | 12/2001 | Ishikawa et al. | 439/157 |
| 6,482,020 B1 | * | 11/2002 | Yeh | 439/159 |
| 6,641,413 B2 | * | 11/2003 | Kuroda | 439/159 |
| 6,655,972 B2 | * | 12/2003 | Sato | 439/159 |
| 6,669,493 B2 | * | 12/2003 | Kuroda | 439/159 |

* cited by examiner

Primary Examiner—Michael C. Zarroli
(74) Attorney, Agent, or Firm—Bacon & Thomas, PLLC

(57) ABSTRACT

An electronic card-ejectable card connector is disclosed to include a base frame, a cover shell, two units of contact pins, and a card ejecting device. The card ejecting device includes a guide member having a guide recess, a positioning bar, and a biasing member. A receiving space is formed between the base frame and the cover shell for accommodating at least two kinds of electronic cards. While an electronic card is inserted into the card connector, the electronic card is stopped in a ready position by the positioning bar held in the guide recess. While ejecting the card, the card is pushed once again to allow the positioning bar to get away from the ready position. Meanwhile, the biasing member provides rebounding resilience to bring the guide member back, thereby pushing the card outwards at a predetermined distance for the user to take it out easily.

5 Claims, 8 Drawing Sheets ized card connector is inefficient in design and mould processing of

ELECTRONIC CARD-EJECTABLE CARD CONNECTOR

BACKGROUND OF THE INVENTION

1. Field of the Invention

The present invention relates generally to electronic apparatuses, and more particularly to an electronic card-ejectable card connector capable of receiving at least two different kinds of electronic cards and ejecting the electronic card semi-automatically by pushing the card a second time after pushing the card into the card connector a first time.

2. Description of the Related Art

A conventional electronic card connector 70, as shown in FIG. 8, is composed of a base frame 71, a plurality of first and second contact pins 73, and a card ejecting device 75. The base frame 71 can accommodate first and second electronic cards to be inserted thereinto. The card ejecting device 75 includes a slide member 76, which is formed of an arched portion 77 for accommodating the inserted first electronic card and a front end 78 for accommodating the inserted second electronic card.

However, the arched portion 77 of the slide member 76 is specifically designed to accommodate a complementary arched portion positioned at a front left side of a memory stick (MS) electronic card such that the aforesaid card connector 70 is inefficient in design and mould processing of its parts and is high in production cost.

SUMMARY OF THE INVENTION

The primary objective of the present invention is to provide an electronic card-ejectable card connector, which is structurally simple, low in production cost, and capable of receiving at least two kinds of electronic cards and ejecting an electronic card semi-automatically.

The foregoing objective of the present invention is attained by the electronic card-ejectable card connector, which is composed of a base frame, a cover shell, two units of contact pins, and a card ejecting device. The base frame includes a concave portion longitudinally in proximity of a lateral side thereof and is covered with the cover shell thereon such that a receiving space having at least two different sized chambers is formed between the base frame and the cover shell. The receiving space has an exit at a front end thereof for inserting at least two different electronic cards and a butt at a rear end thereof. The cover shell includes a top plate having a slot, an elastic piece bent downwards from the slot of the top plate thereof, and at least one lateral wall bent vertically downwards from at least one side thereof and having a through hole at a predetermined position. The two units of contact pins are mounted on the base frame and respectively inside the at least two different sized chambers. The card ejecting device includes an elongated guide member, a positioning bar, and a biasing member. The guide member has a guide recess at a top side thereof and is movably mounted inside the concave portion of the base frame for traversing longitudinally in a predetermined section. The guide recess defines a circuit inside having a first stop point and a second stop point and is provided with a variety of elevations so as to be effective in non-return. The guide member has a crooked portion at rear end thereof extending transversally towards inside of the base frame and a tip portion positioned at a front end thereof. The positioning bar has a body portion held against by the elastic piece of the cover shell, a crank portion positioned at a rear end thereof and pivotably engaging the through hole of the lateral wall for pivoting at a small angle towards random directions by means of an external strength, and a hooked portion bent downwards from a front end thereof for slidably engaged in the guide recess. The biasing member has two ends respectively connected with the base frame and the guide member and provides rebounding resilience to bring the guide member back while the guide member moves backwards to drive the biasing member to be extended.

DETAILED DESCRIPTION OF THE INVENTION

Figure 1:
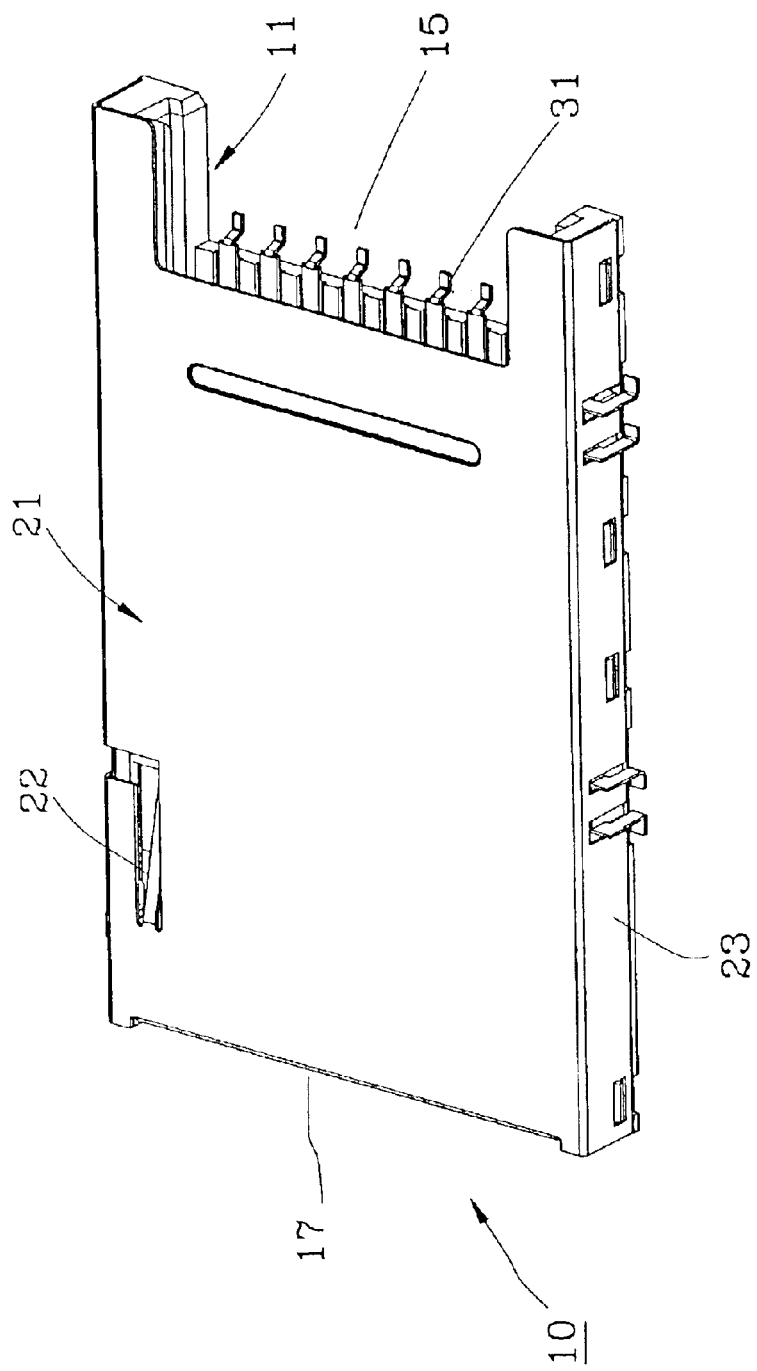
FIG. 1 is a perspective view of a preferred embodiment of the present invention.
Figure 2:
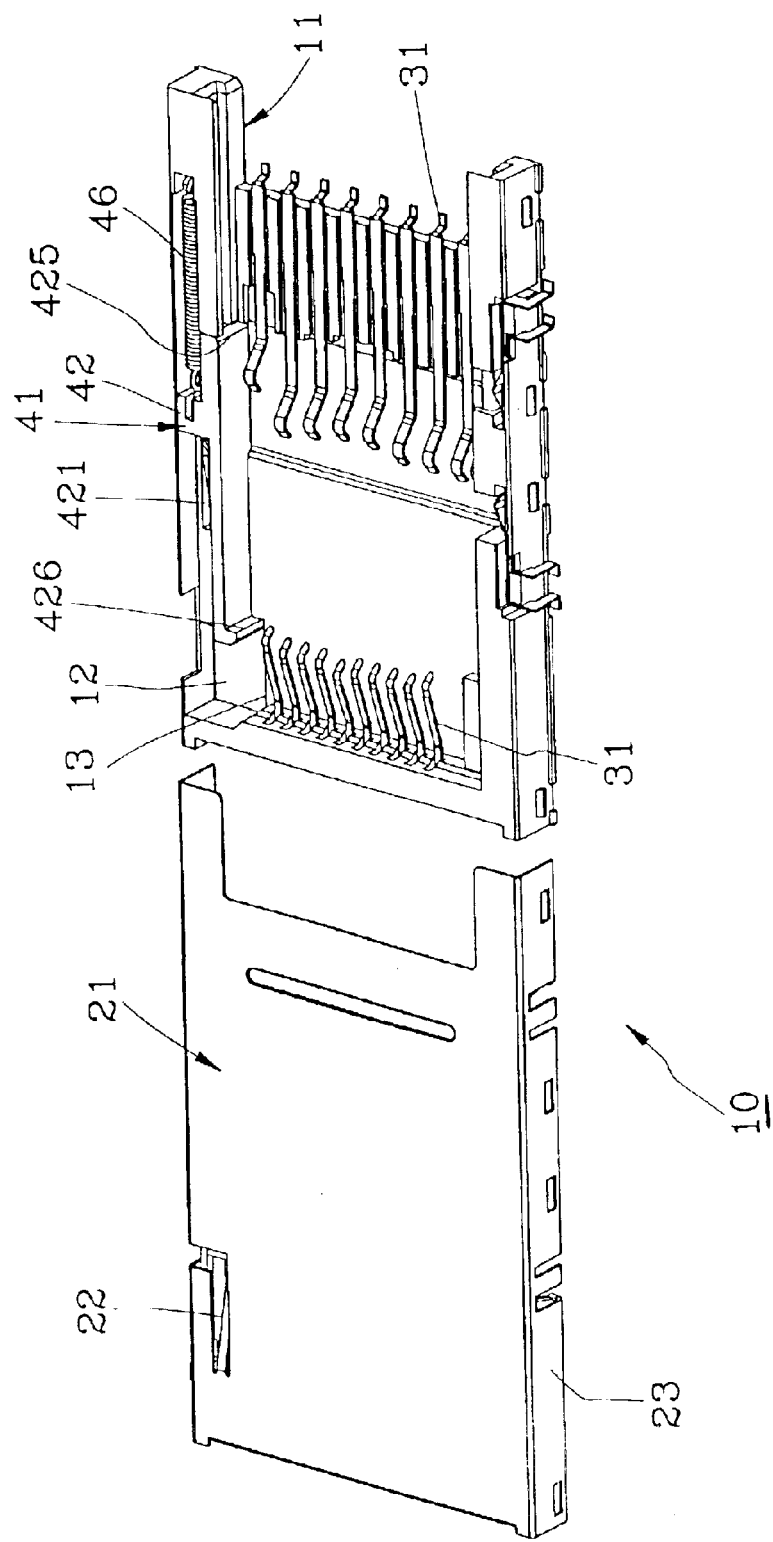
FIG. 2 is a partial exploded view of the preferred embodiment of the present invention.
Figure 3:
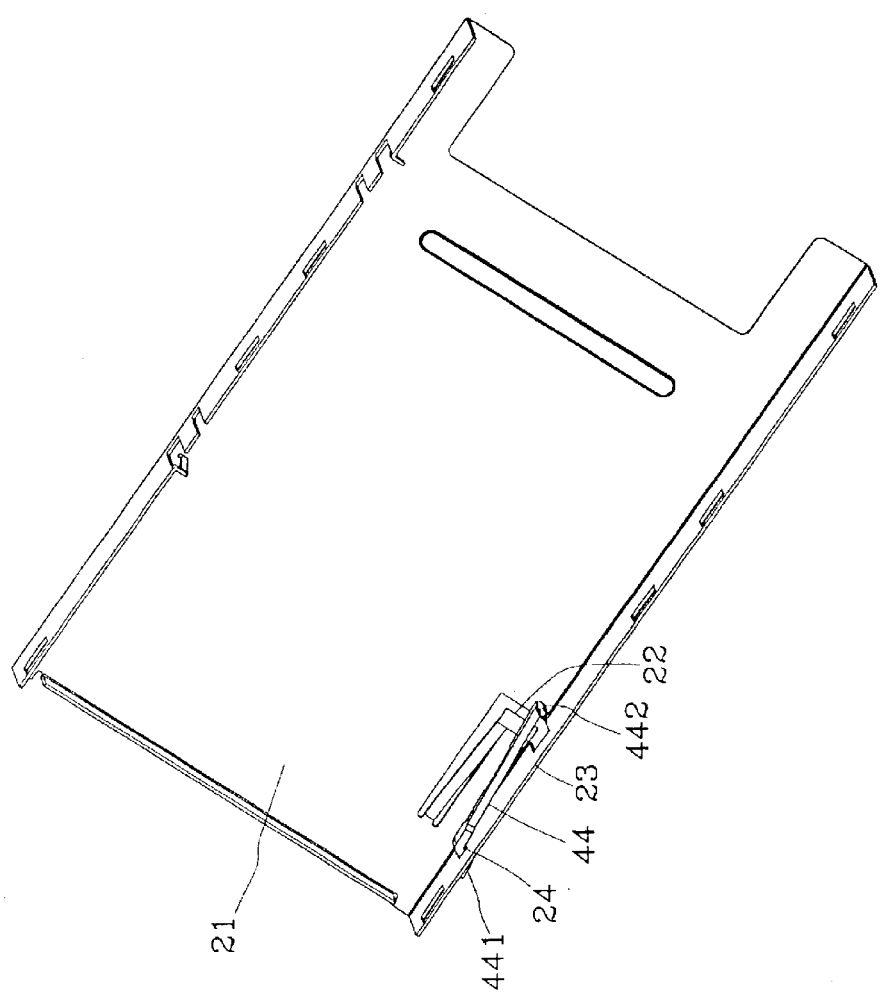
FIG. 3 is a perspective view of parts of the preferred embodiment of the present invention, showing the interrelation between a cover shell and a positioning bar.

Referring to FIGS. 1–4, an electronic card-ejectable card connector 10 of the present invention is composed of a base frame 11, cover shell 21, two units of contact pins 31, and a card ejecting device 41.

The base frame 11 includes a concave portion 12 extending longitudinally in proximity of a lateral side thereof and a recessed section 13 positioned at a rear end of the concave portion 12 and larger than the concave portion 12 in breadth.

The cover shell 21 is covered on the base frame 11 such that a receiving space having two different sized chambers is formed between the base frame 11 and the cover shell 21. The receiving space defines an exit 15 at a front end thereof where at least two different kinds of electronic cards can be inserted and a butt 17 at a rear end thereof. The cover shell 21 includes a top plate having a slot, an elastic piece 22 bent downwards from the slot, and three lateral walls 23 bent downwards respectively from three lateral sides of the top plate and one of which having a through hole 24.

The two units of contact pins 31 are mounted on the base frame 11 and respectively extend into the two chambers of the receiving space between the base frame and the cover shell for contacting an inserted electronic card.

The card ejecting device 41 includes an elongated guide member 42, a positioning bar 44, and a biasing member 46. The guide member 42 is slidably mounted in the concave portion 12 to be pushed to move forwards and backwards in the concave portion. The guide member 32 has a guide recess 421 defining a circuit having a first stop point 422 and a second stop point 423 and having a variety of elevations for non-return, a crooked portion 426 extending from a rear end thereof transversally towards inside of the base frame 11 and disposed in the recessed portion 13, and a tip portion 425 at a front end thereof.

The positioning bar 44 includes a body portion, a crank portion 441 positioned at a rear end thereof and pivotably engaging the through hole 24 of the lateral wall 23 for pivoting at a small angle towards random directions in response to an external force, and a hooked portion 442 positioned at a front end thereof and extending downwards to be slidably engaged in the guide recess 421 for moving between the first and second stop points 422 and 423 when the guide member 42 is pushed.

The biasing member 46 embodied as a spring is connected with the base frame 11 at an end thereof and connected with the guide member 42 at the other end thereof. While the guide member 42 is driven to move backwards, the biasing member 46 is extended to potentially provide rebounding resilience to bring the guide member 42 back towards the exit 15 and further to push the inserted electronic card outwards.

Figure 4A:
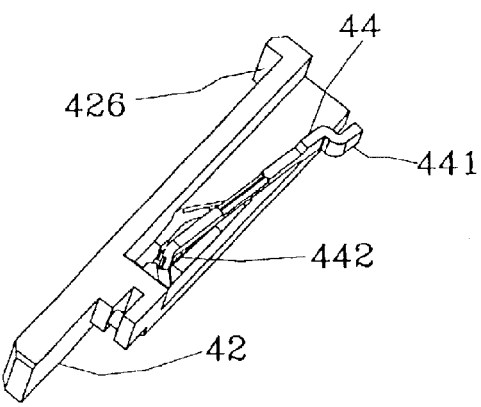
FIG. 4A, FIG. 4B, and FIG. 4C show the relative positions and elevations of the positioning bar engaged slidably in a guide recess of a guide member according to the preferred embodiment of the present invention.
Figure 4B:
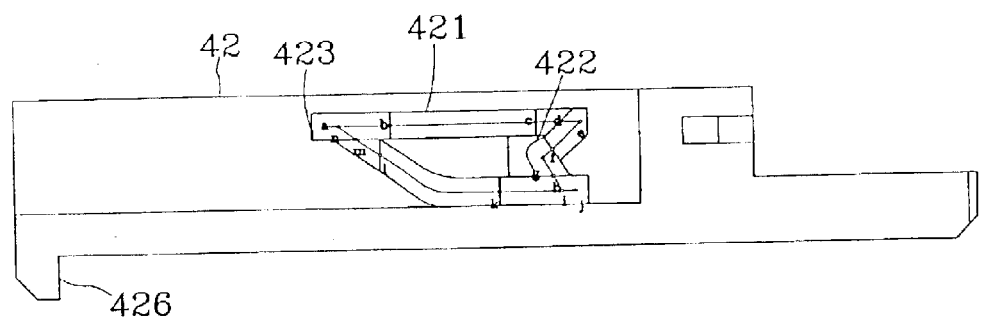
Figure 4C:
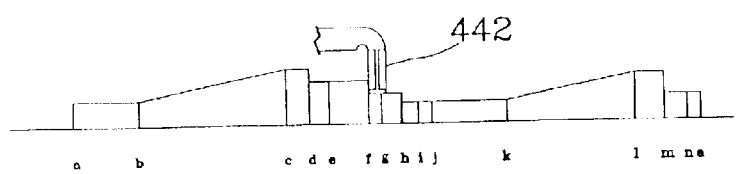

FIG. 4C shows the elevation of each point marked alphabetically from "a" to "n" in the guide recess 421. Differences between the elevations of each two points cause non-return to prevent the positioning bar 44 from moving incorrectly reversely.

Figure 5:
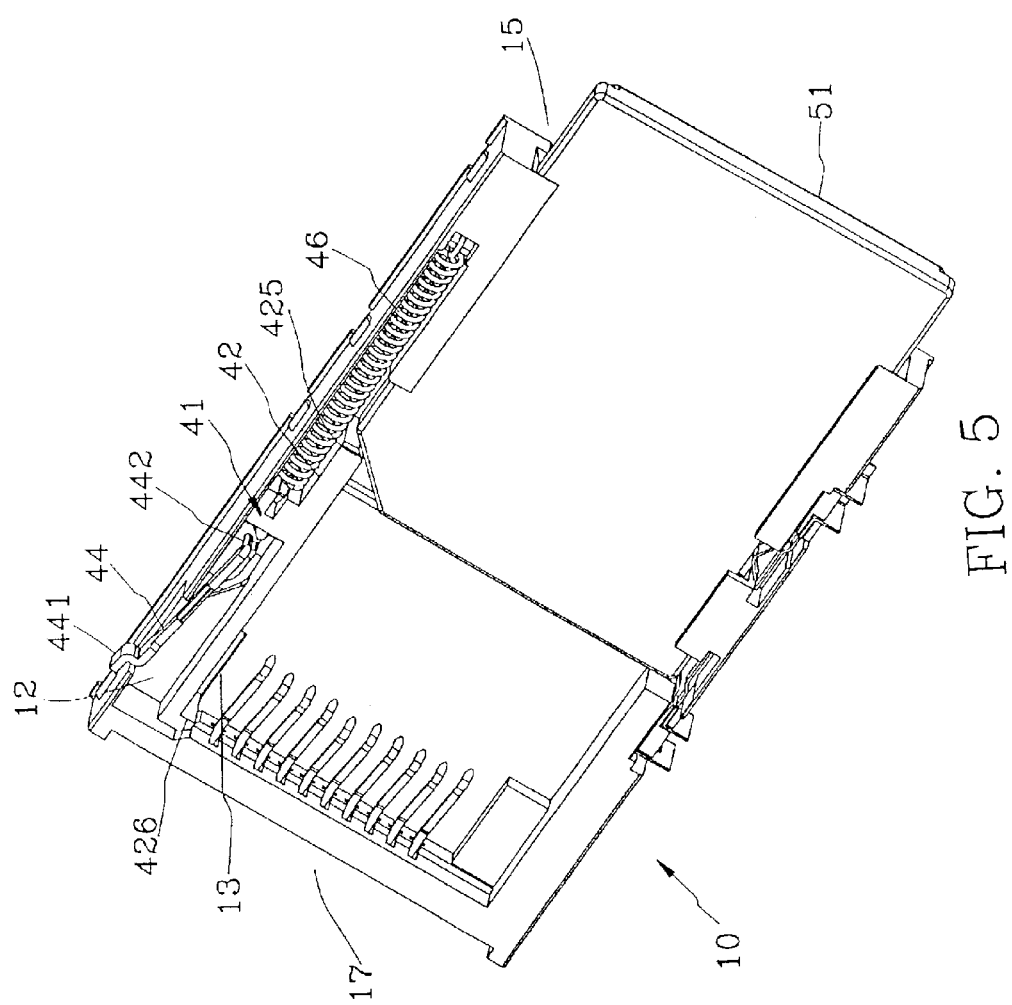
FIG. 5 is a schematic view of the preferred embodiment of the present invention at work, showing that a secure digital (SD) card is inserted.
Figure 6:
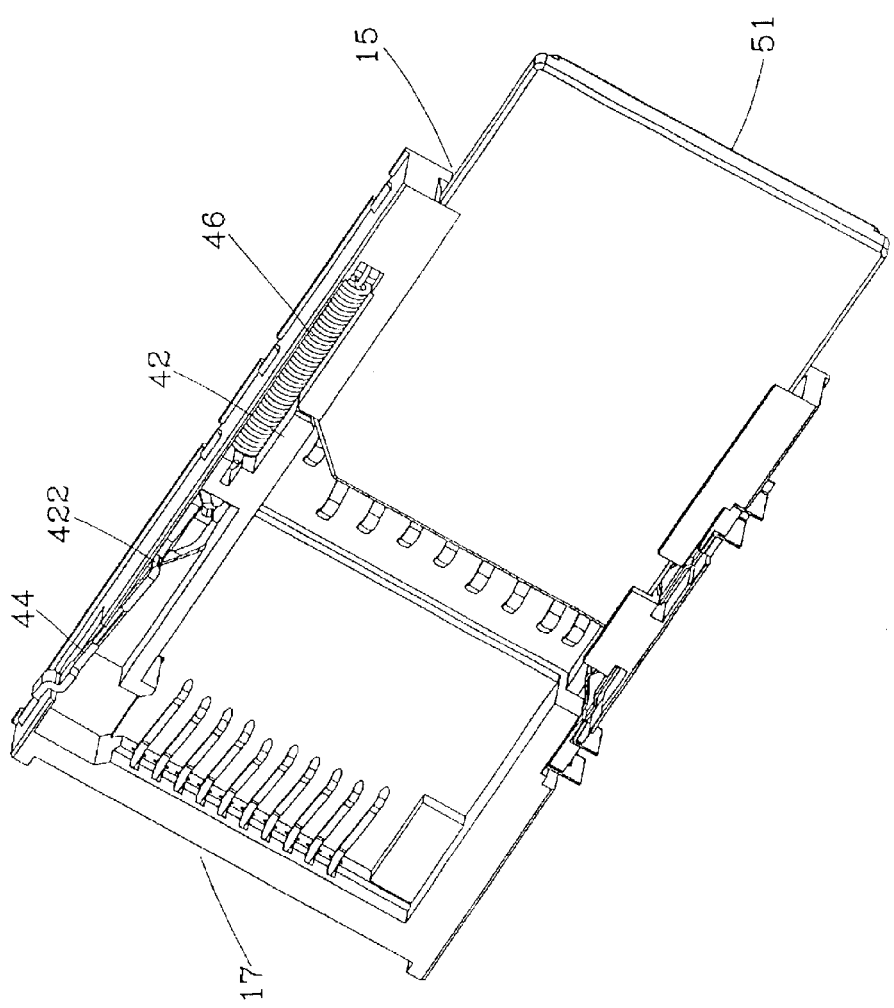
FIG. 6 is another schematic view of the preferred embodiment of the present invention at work, showing that the SD card is ejected.

Referring to FIG. 5, while inserting an SD card 51 into the card connector 10, the user inserts the SD card 51 into the exit 15 and pushes it forwards to contact against the tip portion 425 of the guide member 42 at a slope portion thereof and to further drive the guide member 42 to move towards the butt 17. In the meantime, the hooked portion 442 of the positioning bar 44 is slidably moved along the guide recess 421 to the first stop point 422, thereby stopping the guide member 42 together with the SD card 51. While ejecting the SD card 51 from the card connector 10, it's as easy as pushing the SD card 51 towards the butt 17 once again to drive the guide member 42 to move towards the butt 17 such that the hooked portion 442 of the positioning bar 44 is driven to move away from the first stop point 422 and the guide member 42 is driven by the biasing member 46 to return towards the exit 15, as shown in FIG. 6. Meanwhile, the hooked portion 442 of the positioning bar 44 is slidably moved to the second stop point 423, and the SD card 51 is pushed outwards at a predetermined distance for the user to take the SD card 51 out of the card connector 10. While the hooked portion 442 of the positioning bar 44 is slidably moved along the guide recess 421, the hooked portion 442 is pressed downwards by the elastic piece 22 so as to be kept in the guide recess 421 from running out of the guide recess 421.

Figure 7:
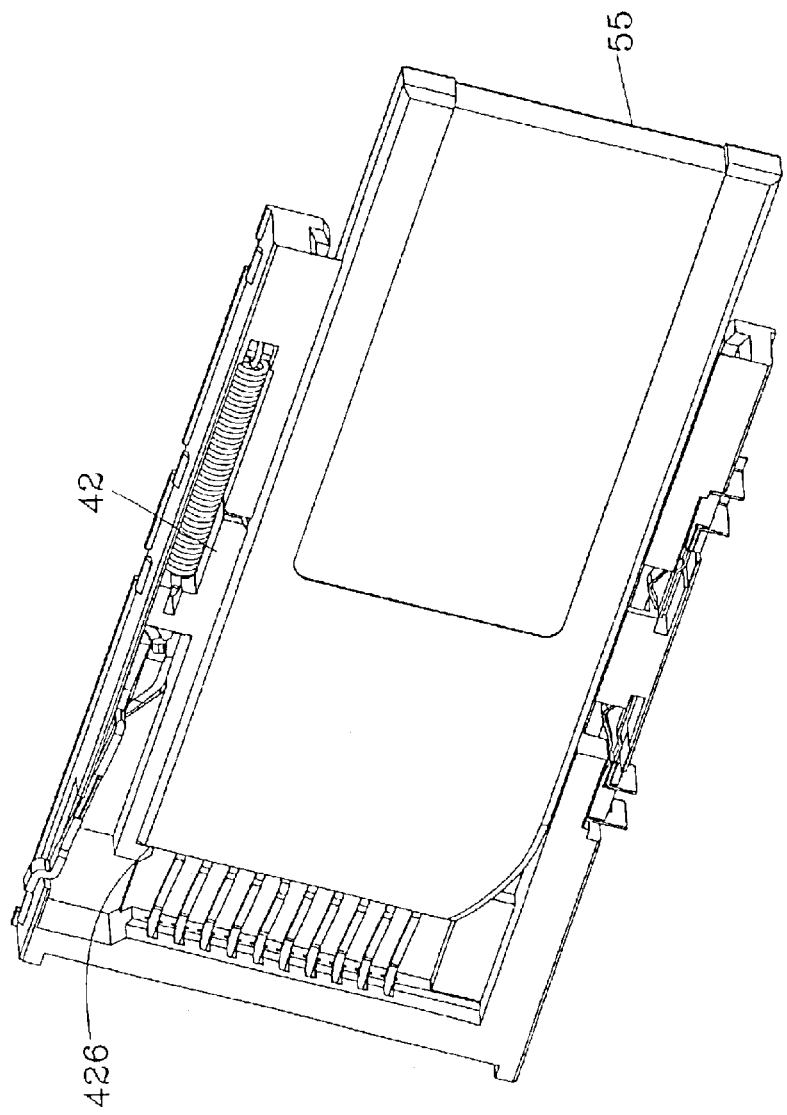
FIG. 7 is still another schematic view of the preferred embodiment of the present invention at work, showing that a memory stick (MS) card is inserted.
Figure 8:
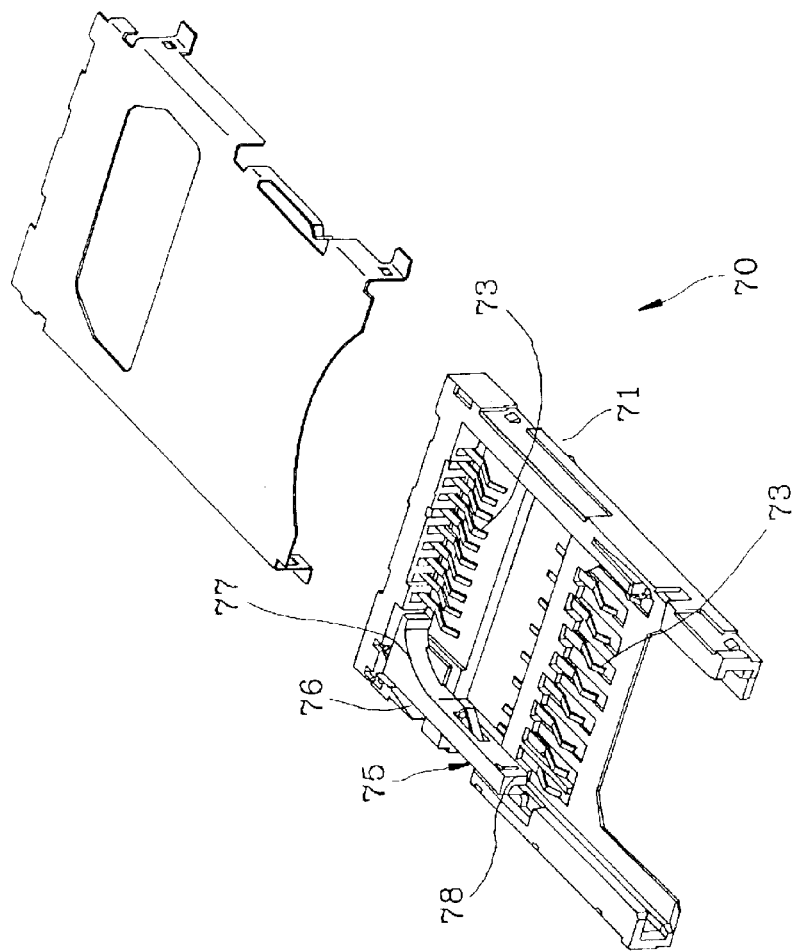
FIG. 8 is a partial exploded view of a prior art.

Referring to FIG. 7 similar to FIGS. 5–6, an MS card 55 is inserted into the card connector 10. The difference between FIG. 7 and FIGS. 5–6 lies in that the breadth of the MS card 55 is smaller than that of the SD card 51, such that while the MS card 55 is pushed forwards into the card connector 10 to contact against the crooked portion 426 of the guide member 42 at a front corner thereof, the guide member 42 is pushed to move backwards likewise.

It is to be noted that the biasing member 46 can be a rubber band, which provides the rebounding resilience likewise.

In conclusion, the card connector of the present invention includes the crooked portion and the tip portion for accommodating different kinds of electronic cards and it's simple to make molds of its parts so as to have low production cost.

What is claimed is:

1. An electronic card-ejectable card connector comprising:

a base frame having a concave portion extending longitudinally and positioned in proximity of a lateral side of the base frame;

a cover shell covered on said base frame and defining, between the cover shell and the base frame on one side of the connector a receiving space, the receiving space having at least two different sized chambers, an exit at a front end of the cover shell for inserting at least two kinds of electronic cards into the cover shell and a butt at a rear end of the receiving shell, said cover shell having a top plate, a slot positioned in said top plate, an elastic piece bent downwards from said slot, and at least one lateral wall bent downwards from at least one side of the cover shell and having a through hole;

two units of contact pins mounted on said base frame and inside said receiving space; and a single card ejecting device situated on said one side of the connector and having an elongated guide member, a positioning bar, and a biasing member, said guide member being movable mounted inside said concave portion of said base frame for traversing longitudinally in a predetermined section, said guide member having a guide recess at a top side of the guide member, a crooked portion extending transversely from a rear end of the guide member towards an inside of the base frame for engaging a front edge of one kind of said electronic cards, and a tip portion at a front end of the guide member for engaging a front edge of another kind of said electronic cards, said guide recess defining a circuit having a first stop point and a second stop point, said guide recess having a variety of elevations so as to cause non-return, said positioning bar having a body portion held downwards by said elastic piece of said cover shell, a crank portion at a rear end of the positioning bar, and a hooked portion extending downwards from a front end of the guide member, said crank portion pivotally engaging said through hole of said lateral wall of said base frame for pivoting randomly in response to a force, said hooked portion being slidably engaged in said guide recess, said biasing member having two ends respectively connected with said base frame and said guide member and providing rebounding resilience to bring said guide member in a forward direction back towards said exit and further to push a card out of said connector after said guide member has been pushed backwards.

2. The electronic card-ejectable card connector as defined in claim 1, wherein said concave portion of said base frame comprises a wide recessed section at a rear end of said base frame, and said crooked portion of said guide member is positioned in said recessed section.

3. The electronic card-ejectable card connector as defined in claim 1, wherein said through hole of said lateral wall of said base frame is slightly larger than said crank portion of said positioning bar dimensionally such that said positioning bar pivots at a small angle towards random directions.

4. The electronic card-ejectable card connector as defined in claim 1, wherein said biasing member is a spring.

5. The electronic card-ejectable card connector as defined in claim 1, wherein said biasing member is a rubber band.

* * * * *